(12) United States Patent
Kanagasabapathi et al.

(10) Patent No.: US 8,812,543 B2
(45) Date of Patent: Aug. 19, 2014

(54) METHODS AND SYSTEMS FOR MINING ASSOCIATION RULES

(75) Inventors: Balasubramanian Kanagasabapathi, Erode (IN); K Antony Arokia Durai Raj, Pollachi (IN)

(73) Assignee: Infosys Limited, Bangalore (IN)

( * ) Notice: Subject to any disclaimer, the term of this patent is extended or adjusted under 35 U.S.C. 154(b) by 359 days.

(21) Appl. No.: 13/111,178

(22) Filed: May 19, 2011

(65) Prior Publication Data

US 2012/0254242 A1   Oct. 4, 2012

(30) Foreign Application Priority Data

Mar. 31, 2011   (IN) .......................... 1057/CHE/2011

(51) Int. Cl.
*G06F 7/00* (2006.01)
*G06F 17/30* (2006.01)

(52) U.S. Cl.
USPC .......................................................... 707/776

(58) Field of Classification Search
USPC .......................................................... 707/776
See application file for complete search history.

(56) References Cited

U.S. PATENT DOCUMENTS

| | | | |
|---|---|---|---|
| 6,182,070 B1 * | 1/2001 | Megiddo et al. ............. | 707/694 |
| 6,185,549 B1 | 2/2001 | Rastogi et al. | |
| 6,952,693 B2 | 10/2005 | Wolff et al. | |
| 7,433,879 B1 | 10/2008 | Sharma et al. | |
| 2003/0078686 A1 * | 4/2003 | Ma et al. ..................... | 700/91 |
| 2005/0027663 A1 * | 2/2005 | Beekmann et al. ............ | 706/12 |
| 2007/0250522 A1 * | 10/2007 | Perrizo ........................ | 707/101 |
| 2008/0147688 A1 | 6/2008 | Beekmann et al. | |
| 2009/0055332 A1 * | 2/2009 | Lee ............................... | 706/12 |

OTHER PUBLICATIONS

Lin et al., Efficient Adaptive-Support Association Rule Mining for Recommender Systems, 2002, Data Mining and Knowledge Discovery, 6, 83-105.*
Agrawal, R., Imielinksi, T. and Swami, A. (1993) "Mining association rules between sets of items in large database," Proceedings of the ACM SIGMOD Conference, Washington DC, USA, pp. 207-216.
Agrawal, R. and Srikant, R. (1994) "Fast algorithms for mining association rules", Proceedings of the 20th VLDB Conference, Santiago, Chile, pp. 487-499.
Cheung, D.W., Han, J., Ng, V.T. and Wong, C.Y. (1996) "Maintenance of discovered association rules in large databases: An incremental updating approach," 12th International Conference on Data Engineering, New Orleans, Louisiana, USA, pp. 106-114.
Park, J.S., Chen, M.S. and Yu, P.S. (1997) "Using a hash-based method with transaction trimming for mining association rules," IEEE Transactions on Knowledge and Data Engineering, vol. 9, No. 5, pp. 813-825.
Han, J., Pei, J. and Yin, Y. (2000) "Mining frequent patterns without candidate generation," Proceeding of the 2000 ACM SIGMOD International Conference on Management of Data, Dallas, USA, pp. 1-12.

(Continued)

*Primary Examiner* — Alexey Shmatov
(74) *Attorney, Agent, or Firm* — Marc S. Kaufman; Stephen M. Hertzler; Reed Smith LLP

(57) ABSTRACT

Systems, methods, and computer-readable code stored on a non-transitory media for mining association rules include determining a minimum support threshold and a minimum confidence threshold for association rule mining; determining a sampling model; sampling transactions from a transaction dataset; mining association rules from the sampled transactions; and transmitting mined association rules.

19 Claims, 6 Drawing Sheets

(56) References Cited

OTHER PUBLICATIONS

Hong, T.P., Wang, C.Y. and Tao, Y.H. (2001) "A new incremental data mining algorithm using pre-large itemsets," Intelligent Data Analysis, vol. 5, No. 2, pp. 111-129.

Chen, B., Haas, P.J. and Scheuermann, P. (2002) "A new two-phase sampling based algorithm for discovering association rules," Proceedings of the eigth ACM SIGKDD International conference on knowledge discovery and data mining, Edmonton, Alberta, Canada, pp. 462-468.

Bronnimann, H., Chen, B., Dash, M., Haas, P. and Scheuermann, P. (2003) "Efficient data reduction with EASE," Proceeding of the ninth ACM SIGKDD International conference on knowledge discovery and data mining, Washington DC, USA, pp. 59-68.

Han, J., Pei, J. and Yin, Y. (2004) "Mining frequent patterns without candidate generation: a frequent-pattern tree approach," Data Mining and Knowledge Discovery, vol. 8, pp. 53-87.

Decker, R. (2005) "Market basket analysis by means of growing neural network," The International Review of Retail, Distribution and Consumer Research, vol. 15, No. 2, pp. 151-169.

Nishi, D. (2005) "Market-Basket Mystery," Retail Technology Quarterly, pp. 12-14.

Hong, T.P., Lin, J.W. and Wu, Y.L. (2006) "A fast updated frequent pattern tree," IEEE International Conference on Systems, Man, and Cybernetics, Taipei, Taiwan, pp. 2167-2172.

Akcan, H., Astashyn, A. and Bronnimann, H. (2008) "Deterministic algorithms for sampling count data," Data & knowledge engineering, vol. 64, No. 2, pp. 405-418.

\* cited by examiner

METHODS AND SYSTEMS FOR MINING ASSOCIATION RULES

RELATED APPLICATION DATA

This application claims priority to Indian Patent Application No. 1057/CHE/2011, filed Mar. 31, 2011, which is hereby incorporated by reference in its entirety.

BACKGROUND

Association rule mining ("ARM") is one of the data mining techniques that extract associations between sets of products, services, or any variables present in transactions. Systems often apply ARM to extract relationships and trends in domains such as retail, telecommunications, banking, bioinformatics, healthcare, and catering to name a few. Resulting association rules help those in an industry to make informed decisions based on the relationships between products and/or services. For example, association rules may help to identify cross-selling and up-selling opportunities in a retail industry.

Association rules may be mined from a set of transactions in a dataset, for example transactions collected at a point of sale ("PoS"). In other words, $D = \{t_1, t_2, \ldots, t_n\}$ where D is a dataset of transactions $t_x$ for x=1 to n, and n is the total number of transactions. Each transaction includes a set of one or more items ("itemsets") out of a set of all items. Items may be, for example, products or services sold, viewed, downloaded, streamed, and the like. In other words $I = \{i_1, i_2, \ldots, i_k\}$ where I is the set of all items $i_x$ for x=1 to k (i.e., I is a k-itemset), and k is the total number of items. A rule is defined as an implication of the form $X \to Y$ where $X, Y \subseteq I$ and $X \cap Y = NULL$ and where X and Y are the antecedent and consequent itemsets of the rule respectively.

To select useful rules from a set of all possible rules, constraints on various measures of significance and interest may be useful. An important property of an itemset is its "support count", which refers to the total number of transactions in a dataset that contain a particular itemset. Additionally, the "support" of an itemset indicates the applicability of a rule for a given dataset. A rule that has very low support may occur simply by chance. The formal definition of support may be given by equation 1:

$$s(X \to Y) = \frac{\sigma(X \cup Y)}{n} \quad (1)$$

where X is the antecedent itemset, Y is the consequent itemset, σ is a support function, and n is the number of transactions in the dataset.

The "confidence" of an itemset indicates how often itemset Y appears in transactions that contain itemset X. The formal definition of confidence may be given by equation 2:

$$c(X \to Y) = \frac{\sigma(X \cup Y)}{\sigma(X)} \quad (2)$$

where X is the antecedent itemset, Y is the consequent itemset, and σ is a support function. Confidence is a measure of accuracy or reliability of the inference made by the rule that the number of instances that the association rules will predict correctly out of all instances it applies to.

Association rules generally are required to satisfy user-specified minimum support and user-specified minimum confidence thresholds at the same time to be considered useful. However, there is no defined approach for a user to set the values of minimum support and minimum confidence. In each instance, a user must have specific knowledge about the working mechanism of the algorithm being used as well as knowledge about the data in order to determine useful values for minimum support and minimum confidence.

Typically, the task of association rule mining is carried out in two steps. First, a minimum support constraint is applied to itemsets in a dataset to determine all frequent itemsets (i.e., frequent itemsets are all itemsets having at least a threshold support). Next, a minimum confidence constraint is applied to all frequent itemsets to form rules. However, finding all frequent itemsets in a dataset may be computationally intensive as the number of frequent itemsets grows exponentially in relation to the number of transactions. To cope with the exponential growth, various algorithms such as the Apriori algorithm, the frequent pattern growth ("FP-growth") algorithm, and others have been used to more efficiently mine association rules. However, known algorithms all have drawbacks. For example, the Apriori algorithm requires significant computational effort on a large dataset. Additionally, the FP-growth algorithm is memory intensive if many or all transactions are unique in the transaction database. Additionally, the number of association rules extracted by the FP-growth algorithm is less compared to the number of association rules extracted according to the Apriori algorithm. Other known algorithms have similar deficiencies.

Sampling has also been employed to speed up frequent itemset mining. Methods have been disclosed for taking random samples of transactions or heuristic samples of transactions to mine frequent itemsets. However, sampled transactions resulting from random sampling may not accurately represent the actual population. Additionally, while heuristic sampling may be more accurate than random sampling, heuristic sampling methods are computationally intensive and may require excessive computing resources. Improved sampling methods are desired.

While systems and methods are described herein by way of examples and embodiments, those skilled in the art recognize that systems and methods for mining association rules are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must).

Similarly, the words "include", "including", and "includes" mean including, but not limited to.

DETAILED DESCRIPTION

Disclosed embodiments provide computer-implemented methods and systems for mining association rules. These methods and systems may provide sampling-based methods that improve over known random and heuristic sampling methods. Embodiments may also heuristically generate minimum support and minimum confidence thresholds.

Figure 1:
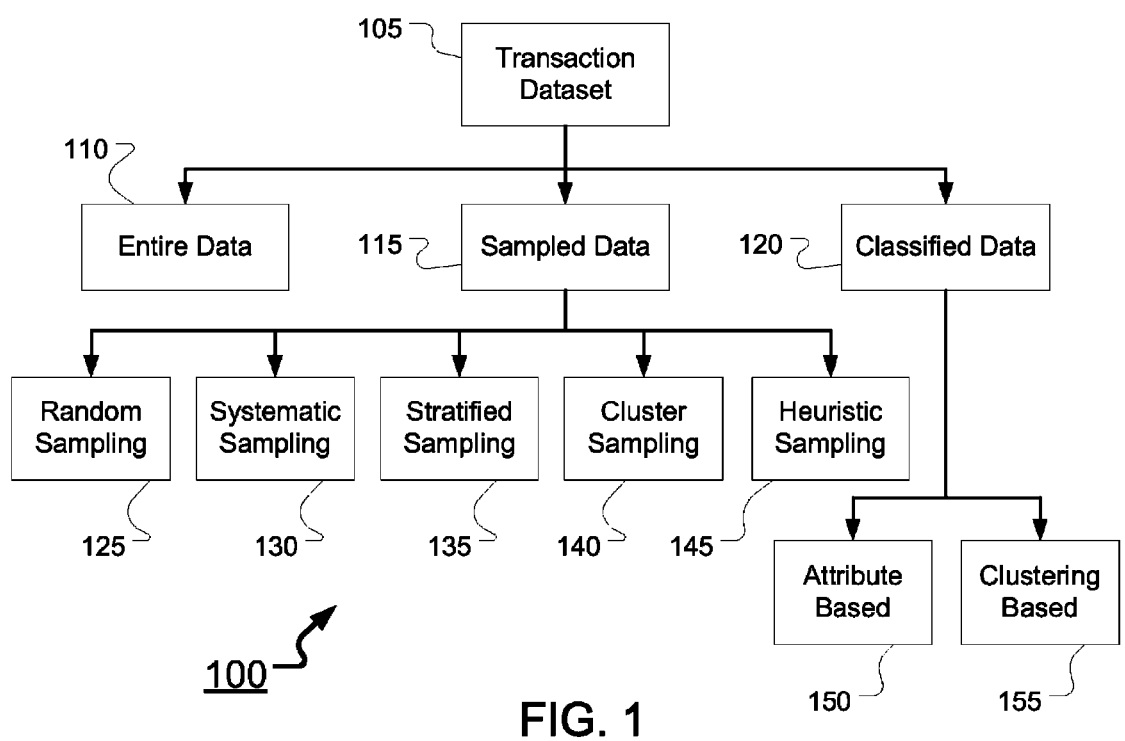
FIG. 1 shows a functional diagram of exemplary divisions of transactions in a transaction dataset.

Embodiments provide systems and methods to generate association rules based on transaction data available from a dataset, such as data gathered at a PoS. Embodiments allow generation of association rules following various approaches such as considering all transactions in a dataset, considering sampled transactions in a dataset, and considering classified transactions in a dataset. FIG. 1 shows a functional diagram 100 of exemplary divisions of transactions in a transaction dataset 105. Frequent itemset mining and association rules mining may be performed on the entire data 110 (i.e., every transaction in the dataset), on sampled data 115, and on classified data 120. Embodiments may utilize several sampling methodologies, for example random sampling 125, systematic sampling 130, stratified sampling 135, cluster sampling 140, and heuristic sampling 145. Embodiments may also classify classified data 120 according to various classification methodologies, for example attribute based 150 classification and clustering based 155 classification. The following explains details of these various sampling and classification methodologies and systems and methods for applying them.

Figure 2:
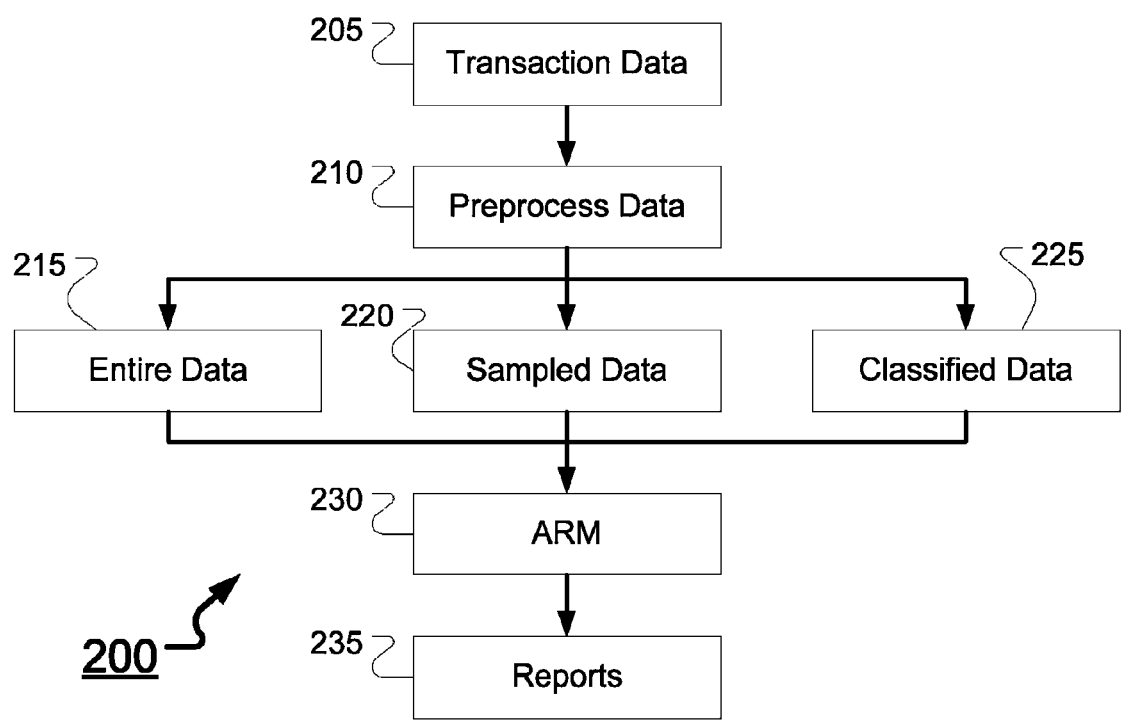
FIG. 2 shows an exemplary functional block diagram for an ARM system.

FIG. 2 shows an exemplary functional block diagram for an ARM system 200. At block 205, all transaction data from a transaction dataset may be received by or accessed by the system 200. At block 210, the system 200 may preprocess the data. Preprocessing may include removing all transactions that have below a threshold number of items. For example, all transactions having a single item may be removed. By way of further example, transactions with only two items may be removed because association rules for transactions having an antecedent itemset containing only a single item and a consequent itemset containing only a single item may be deemed less useful than association rules for transactions having an antecedent and/or consequent itemset containing plural items. Additionally, transactions having only two items may increase resource usage by producing many frequent itemsets while producing few association rules that meet minimum confidence requirements.

At block 210, preprocessing may additionally apply various analytical models to draw samples or classify the data for further analysis. For example, at block 215 the entire dataset of transactions may be provided from preprocess data block 210. Of course, at block 215 the entire dataset may include all transactions in the dataset or may include a subset of the entire dataset other than a sampled or classified subset. For example, embodiments having transactions with items below a threshold value removed by preprocessing at block 210 may have all transactions in the dataset having at least a threshold number of items at block 215.

Alternatively, at block 220 sampled data may be received from preprocessing according to a sampling model. For example, at block 220 sampled data may be received according to any of the sampling models shown in FIG. 1. Further, at block 225 classified data may be received from preprocessing according to a data classification model, such as attribute based classification or clustering based classification.

At block 230, an ARM algorithm may be implemented to mine association rules from either the entire data, sampled data, or classified data. Any ARM algorithm may be used, such as the Apriori algorithm or the FP-growth algorithm. At block 235, resulting association rules mined according to an ARM algorithm are reported, for example transmitted to a user. At block 235 other statistical information may be presented to a user as well, for example the support and/or confidence of each rule.

Figure 3:
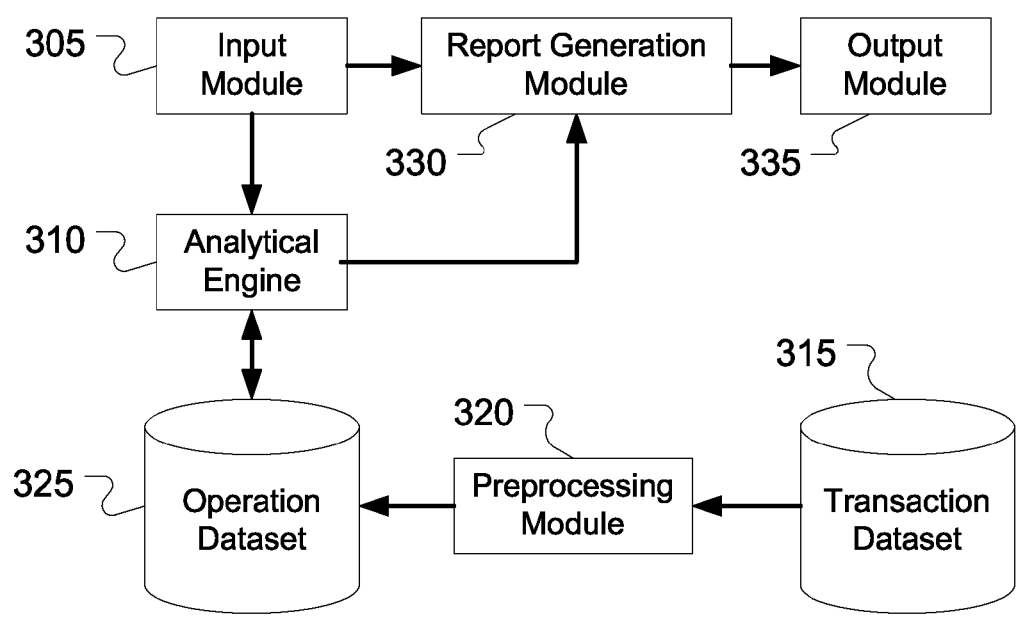
FIG. 3 shows an exemplary architecture for an ARM system.

FIG. 3 shows an exemplary architecture for an ARM system 300. System 300 may mine association rules from datasets in various formats, for example relational databases, text documents, and so on. System 300 includes a transaction dataset 315. Transaction dataset 315 may, for example, be a dataset configured to receive all transactions from a PoS system (not shown). In addition to receiving data identifying the items in each transaction, transaction dataset 315 may receive at least one of attributes of the items, data identifying and/or attributes regarding the customer (e.g., age, gender, monthly income, etc.), and attributes about each transaction (e.g., location of the transaction, time of the transaction, an indication whether the transaction occurred during a holiday promotion, etc.). This additional data may be stored in transaction dataset 315, for example associated with the transaction, and may be useful for classifying transactions and/or dividing transaction into strata. Preprocessing module 320 may perform various preprocessing functions on transactions in the transaction dataset 315 and may output preprocessed transactions to an operation dataset 325. For example, preprocessing module 320 may remove transactions having below a threshold number of items, sample transactions according to various sampling methods disclosed herein, classify transactions according to various classification methods disclosed herein, and the like.

Input module 305 may be configured to receive user input, for example through a computing device user interface. Input module 305 may, for example, receive input relating to a sampling model or classification model a user wishes to use for mining association rules, an ARM algorithm a user wishes to apply, minimum support or minimum confidence values association rules must meet, details to show in reports, and the like. Analytical engine 310 may be configured to select a subset of transaction in the operation dataset (e.g., the entire set of transaction records, sampled records according to a sampling model, classified records according to a classification module, etc.), find frequent itemsets within the subset of transactions, mine association rules from the frequent itemsets according to an ARM algorithm, and output association rules to report generation module 330. Analytical engine 310 may also determine and output various statistics-based performance measures relating to association rules, for example support and confidence, and/or statistics relating to the generation of the association rules, such as the time taken to generate the rules, resource usage, and the like. Analytical engine 310 may also store data in operation dataset 325. Embodiments may also include a system to evaluate the association rules generated by analytical engine 310 based on the standard statistics-based performance measures. By way of non-limiting example, statistics-based performance measures may include φ-coefficient, Goodman-Kruskal's (λ), Odds ratio (α), Yule's Q, Yule's Y, Kappa (κ), Mutual Information (M), J-Measure (J), Gini index (G), Support (s), Confidence (c), Laplace (L), Conviction (V), Interest (I), cosine (IS), Piatetsky-Shapiro's (PS), Certainty factor (F), Added Value (AV), Collective strength (S), Jaccard (ζ), and Klosgen (K).

Report generation module 330 may receive association rules and other data from analytical engine 310 and user preferences or other user input from 305. Report generator module 330 may then generate reports that may contain the association rules and other data from analytical engine 310 according to user input received by input module 305. Report generation module 330 may transmit reports to an output module 335. Output module 335 may, for example, transmit reports to a display device for a user to view, transmit reports to a web server to allow a user to view via a browser, transmit reports to a printer or other output device, and the like.

Sampling performed by processing module 320 may provide powerful data reduction techniques. As the volume of data increases in transaction dataset 315, ARM algorithms require significant resources and take significant amounts of time to arrive at association rules. Thus, sampling may greatly reduce the processing complexity and resource usage for determining frequent itemsets from a dataset. Sampling may also facilitate interactive ARM, such as allowing a user to first mine a very small sample and adjusting the sample size depending on the results of the first sample. Interactive mining, for example, may iteratively increase a sample size until interesting association rules are found, interesting association rules being rules having at least a minimum support and at least a minimum confidence.

A primary challenge in developing sampling models stems from the fact that support of an itemset in a sample generally deviates from the support of the entire database. In other words, a rule may appear to be true more or less times proportionate to the sample size than it would in the entire dataset. Such luck-of-the-draw fluctuations can result in missing itemsets that are frequent in the entire dataset but not in the sample and giving too much weight to itemsets that are frequent in the sample but not in the entire dataset.

In a simple random sampling model, a sample set includes transactions chosen randomly without replacement. By including transactions without replacement, each transaction in the entire dataset has the same probability of being chosen at any stage during the sampling process.

In a systematic sampling model, a sample set includes transactions chosen from plural ordered sampling frames. An exemplary method for implementing a systematic sampling model is an equal-probability method. In an equal probability method, every $k^{th}$ transaction is selected where k, the sampling interval, is calculated as $$k = \frac{N}{n},$$

where n is the sample size and N is the size of the dataset (i.e., the number of transactions in the dataset). An equal-probability method may provide a representative sample of a logically homogenous dataset because systematic sample units are uniformly distributed over the population. Systematic sampling may also be faster than random sampling if variance within a systematic sample is greater than variance within the dataset. Alternatively, a systematic sampling model may implement non-equal-probability methods.

In a stratified sampling model, a sample set includes transactions chosen from plural strata (i.e., subpopulations) of the dataset. A module may first divide the dataset into plural strata with each stratum containing plural transactions. Each stratum may be selected to be relatively homogenous with regard to a customer attribute (e.g., age, sex, monthly income, etc.). Each stratum should also be selected to be mutually exclusive of all other strata and the strata should be collectively exhaustive (i.e., each transaction is in one and only one stratum according to a customer attribute value). One of a random sampling model or a systematic sampling model may then be implemented to sample within each stratum. Association rules may then be mined from the set of sampled transactions from various strata according to an ARM algorithm. Stratified sampling may improve the representativeness of the sample by reducing sampling error. In embodiments where customer attribute information is not known or is unavailable to the system, the system may automatically apply clustering based classification to arrive at groups of data from the transaction data. Also, based on the user input ARM can be run on each strata to identify rules for each strata.

In a clustering sampling model, the transactions in the dataset may be divided into clusters and then a cluster may be randomly selected as a representative sample of the entire dataset. Clusters may be selected to be mutually exclusive and collectively exhaustive. Transactions within each cluster may be selected to be highly heterogeneous while various clusters may be relatively homogenous. Thus, each cluster may provide a small scale representation of the total population. A module may first divide a dataset into plural clusters then may randomly select one or more cluster to treat as a representative population of the entire transaction dataset. ARM models may then be applied to all of the transactions of one or more clusters to generate association rules for the dataset. Alternatively, transaction from within a cluster may be sub-sampled and ARM models may be applied to the sub-sampled transaction set to generate association rules for the dataset.

Selection of transactions in the dataset to include in various clusters may be performed, for example, by preprocessing module 320 or by analytical engine 310. A clustering model, such as a partition based clustering model or a hierarchical clustering model may be implemented, for example according to the k-means algorithm, agglometric algorithm, and so on. Selection of transactions to include in various clusters may, for example, be based on a geographical area where the transaction occurred.

An exemplary heuristic sampling model is the Finding Associations from Sampled Transactions ("FAST") algorithm, a two-phase sampling based algorithm for discovering association rules in large databases. In the first phase, a large initial sample of transactions is collected and used to quickly and accurately estimate the support of each individual item in the dataset. In the second phase, a small final sample is obtained from the initial sample in such a manner that the support of each item in the final sample is close to the estimated support of the item in the entire database. Two approaches to obtaining the final samples in the second stage are the "trimming" approach and the "growing" approach. The trimming approach starts from the large initial sample and continues removing outlier transactions until a specified stopping criterion is satisfied. In contrast, the growing approach selects representative transactions from the initial sample and adds them to an initially empty data set. In either approach, the transactions are trimmed or appended to the sample by forcing the supports of the single-item itemsets in the sample to approximately close to those in the dataset. Such proximity in turn ensures that the set of association rules discovered in the sample overlaps to a high degree with the actual set of association rules. The FAST algorithm identifies more frequent itemsets and fewer false itemsets than naïve sampling-based algorithms. Moreover, because the expensive operation of identifying the association rules is performed on the relatively small final sample, the FAST algorithm can identify most, if not all, of the frequent itemsets in a database at an overall cost that is much lower than that of classical algorithms, such as random sampling. The sample created by the FAST algorithm can be subsequently processed by any existing ARM algorithms. Embodiments may allow a user to select to either use a trimming or growing approach to implement a heuristic sampling model.

In addition to, or as an alternative to, these exemplary sampling models, embodiments may implement statistical classification models. For example, a module may be configured to statistically classify transactions in a dataset based on attributes or attribute values of items in each transaction or attributes of the transactions themselves. Attribute based classification may provide relatively homogenous groups (i.e., groups having relatively homogenous transaction based on attributes of the transactions and/or attributes of the items in the transactions) while the clusters themselves may be relatively heterogeneous. Alternatively, if attributes are not associated with the transaction data, clustering based classification may be used based on partition or hierarchical clustering methods.

Figure 4:
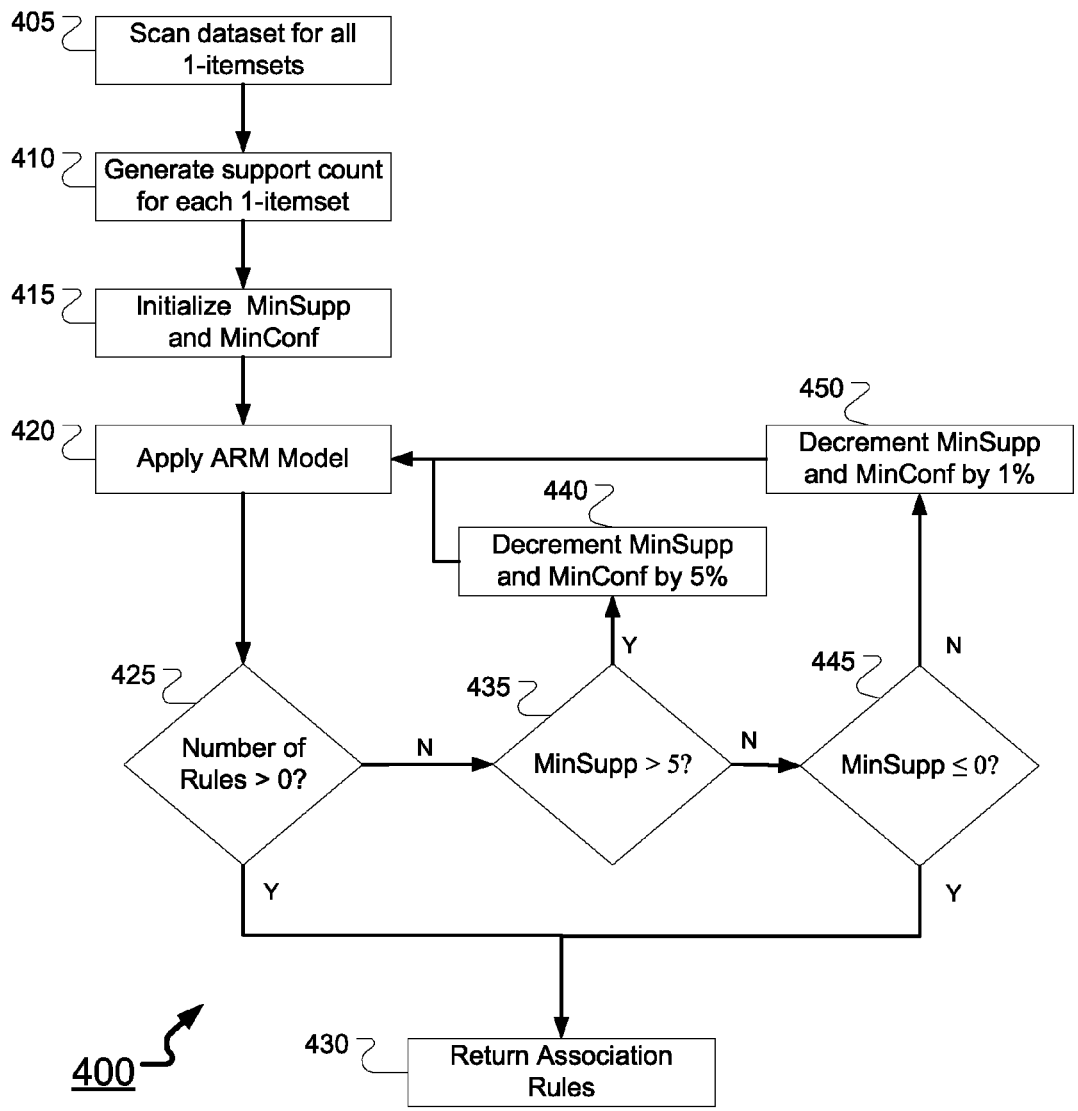
FIG. 4 shows an exemplary flow diagram of a method for heuristically generating at least one of a minimum support threshold and a minimum confidence threshold.

Embodiments may heuristically generate minimum support and minimum confidence thresholds. For example, analytical engine 310 may be configured to consider the support count of all single itemsets in the dataset to generate a minimum support threshold and minimum confidence threshold. FIG. 4 shows an exemplary flow diagram of a method 400 for heuristically generating at least one of a minimum support threshold and a minimum confidence threshold. At block 405, a module may scan all transactions in the dataset for single itemsets (i.e., 1-itemsets). Once all 1-itemsets are found, at step 410 a module may generate a support count for each 1-itemset. At step 415, a module may then initialize at least one of a minimum support threshold ("MinSupp") and a minimum confidence threshold ("MinConf"). For example, MinSupp may be initialized to the arithmetic mean of the minimum support of a 1-itemset and the maximum support of a 1-itemset and the MinConf may be initialized to be equal to the MinSupp. In other words, MinSupp and MinConf may be initialized according to equations 3 and 4:

$$MinSupp = \frac{\min\{\text{support of } 1 - itemset\} + \max\{\text{support of } 1 - itemset\}}{2} \quad (3)$$

$$MinConf = MinSupp \quad (4)$$

At step 420, a module applies one or more ARM model to mine association rules that satisfy the MinSupp and the MinConf. Step 420 may apply an ARM model selected by a user or may be configured to determine one or more ARM model to apply. For example, a user may select an automatic mode, and in response to the user selection at step 420 a module may select an ARM model based on attributes of the dataset (e.g., size, whether or not attributes of transactions are present, etc.), system resources (e.g., execution speed of the system, available memory, etc.), and the like. At step 425, a module determines if at least a threshold number of association rules were mined in step 420 (i.e., determine if any association rules satisfied the MinSupp and MinConf). For example, at step 425 a module may determine whether at least one association rule was mined at step 420 that satisfies the MinSupp and MinConf. If so, at step 430 a module may transmit at least one association rule, for example a module may transmit at least one association rule to report generation module 330 shown in FIG. 3. Alternatively, if at step 425 a module determines that no association rules were mined that satisfy the MinSupp and MinConf, at step 435 a module may determine if at least one of the MinSupp and the MinConf is greater than a first value, for example greater than 5. If at step 435 a module determines that at least one of the MinSupp and the MinConf are greater than the first value, at step 440 at least one of the MinSupp and the MinConf may be reduced by a first percentage, for example five percent. After step 440, method 400 may return to step 420.

Alternatively, if at step 435 a module determines that neither of the MinSupp nor the MinConf are greater than the first value, at step 445 a module may determine whether at least one of the MinSupp and the MinConf is less than or equal to a second value, for example zero. If so, method 400 may proceed to step 430 and transmit an indication that less than the threshold at step 425 number of association rules were found for the dataset (e.g., no association rules were found if the threshold at step 425 is zero) and, if there are any, the association rules found. If at step 445 a module determines that neither the MinSupp nor the MinConf is less than or equal to the second value, at step 450 a module may decrement at least one of MinSupp and MinConf by a second percentage, for example one percent. After step 450, method 400 may return to step 420. Method 400 may iterate through step 420 as many times as may be necessary until either step 425 or step 445 is satisfied.

Method 400 may, for example, be implemented by modules in analytical engine 310 of FIG. 3. Embodiments may, for example, allow a user to manually enter a MinSupp and a MinConf and, if the user does not provide at least one of a MinSupp or a MinConf, perform method 400 to heuristically generate at least one of a MinSupp and a MinConf. Alternatively, a user may simply select to have at least one of the MinSupp and the MinConf heuristically generated. In other embodiments, analytical engine 310 may be configured to perform method 400 even when a user provides a MinSupp and MinConf if no association rules are found that satisfy the user provided thresholds. Embodiments may provide improvements over conventional ARM systems that require a user to have sophisticated knowledge of the dataset and ARM model to determine useful MinSupp and MinConf values.

Method 400 may initialize MinSupp to equal MinConf and maintain equal MinSupp and MinConf values at all times. Alternatively, MinSupp and MinConf may be determined independently. Additionally, method 400 is an exemplary method for heuristically generating a MinSupp and MinConf, alternative embodiments may include fewer, greater, or different steps. For example, embodiments may select various threshold values and detrimental percentages based on an ARM model being applied at step 420.

Figure 5:
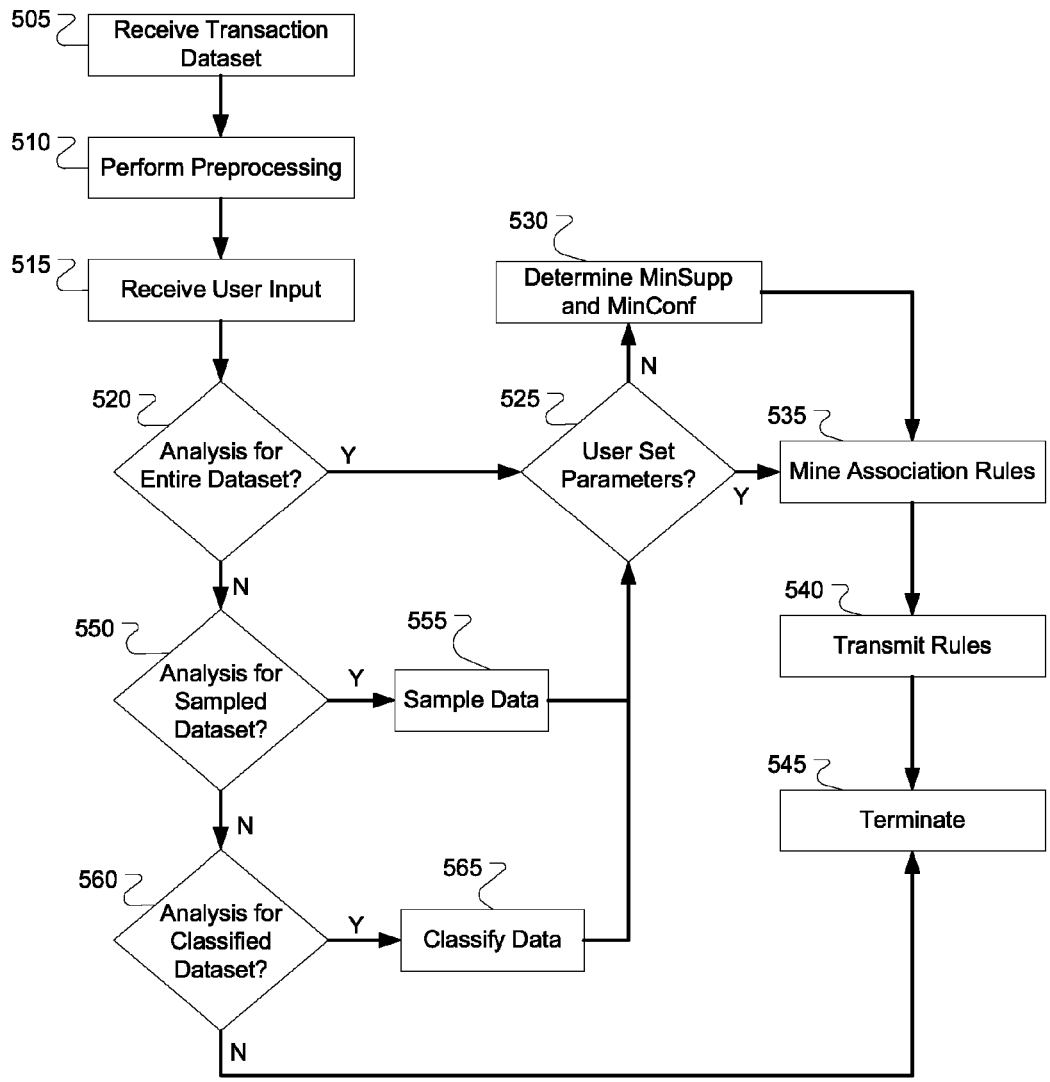
FIG. 5 shows a flow chart of an exemplary method for mining association rules.

FIG. 5 shows a flow chart of an exemplary method 500 for mining association rules. At step 505, a transaction dataset may be received, for example from a PoS system or from another dataset of transactions. The dataset may include demographic data relating to the customer of each transaction, such as age, sex, monthly income, locality, and the like stored along with the items of the transaction. At step 510, preprocessing may be performed on the received transaction dataset. At step 515, user input may be received, for example user input selecting a type of analysis (e.g., an ARM model to apply), a sampling method or classification method, threshold values (e.g., MinSupp and/or MinConf, or threshold values for a heuristic determination of MinSupp and/or MinConf), and the like. Alternatively, step 515 may be performed before step 510 and step 510 may perform specific preprocessing in response to user input received at step 515.

At step 520, a module may determine if the analysis is for the entire dataset, for example based on the user input received at step 515. If the analysis is for the entire dataset, system 500 may proceed to module 525 which determines if the user set MinSupp and MinConf parameters. If the user did not, at step 530 a module may determine MinSupp and MinConf thresholds. For example at step 530 method 400 may be performed. After step 530, the MinSupp and MinConf thresholds may be used at step 535 to perform association rule mining. Of course, as shown in FIG. 4, a heuristic method may cycle through steps 530 and 535 plural times to mine association rules and modify MinSupp and MinConf thresholds. If at step 535 it is determined that the user set MinSupp and MinConf thresholds, at 535 association rules may be mined according to the user set thresholds. After association rules are mined, at step 540 the mined association rules may be transmitted to a downstream system or device, such as report generation module 330 of FIG. 3. At step 545 method 500 may then terminate.

If step 520 determines that the analysis is not for the entire dataset, at step 550 it is determined whether the analysis is for a sampled dataset. If so, at step 555 the data may be sampled, for example according to a data sampling methodology specified by the user input at step 515 or according to a data sampling methodology automatically selected by a module, for example based on attributes of the dataset, system resources, and the like. The data sampling methodology may be, for example, a data sampling methodology shown in FIG. 1. After step 555, method 500 may proceed to step 525 and proceed as described above.

If step 550 determines that the analysis is not for a sampled dataset, at step 560 it is determined whether the analysis is for a classified dataset. If so, at step 565 the data may be classified, for example according to a data classification methodology specified by the user at step 515. The data classification methodology may be, for example, a data classification methodology shown in FIG. 1. After step 565, method 500 may proceed to step 525 and proceed as described above. Alternatively, if step 560 determines that the analysis is not for a classified dataset, method 500 may proceed to step 545 and terminate without mining association rules.

Embodiments may also include a module configured to perform heuristic based pruning. Heuristic based pruning may be performed, for example, as a preprocessing step. Such a module may generate a sample, for example based on a sampling methodology shown in FIG. 1. The module may then consider two items from the sampled itemset and calculate a statistical measure, such as the jaccard coefficient, between the two items. These steps may then be repeated for all two item combinations in the itemset (e.g., for a 3-itemset, calculate jaccard coefficients between item 1 and item 2, item 2 and item 3, and item 3 and item 1). Next, if the correlation for any item with all of the other items is below a threshold, then the item may be removed from the analysis. The population data subjected to an ARM model may then exclude the items with low correlation.

Additionally, while example association rules given herein generally include itemsets as both the left hand side and right hand side of the rule (e.g., antecedent and consequent itemsets), alternative embodiments may include attributes, classifications, and the like in association rules. For example, each transaction may have a transaction attribute classifying the customer in the transaction (e.g., young, middle-aged, old, etc.). An exemplary mined association rule for such a dataset may include items on the left hand side and a classification on the right hand side (e.g., item 1, item 2, and item 3→young). Of course, any attributes of the transaction or items in the transaction may be used to mine association rules.

Figure 6:
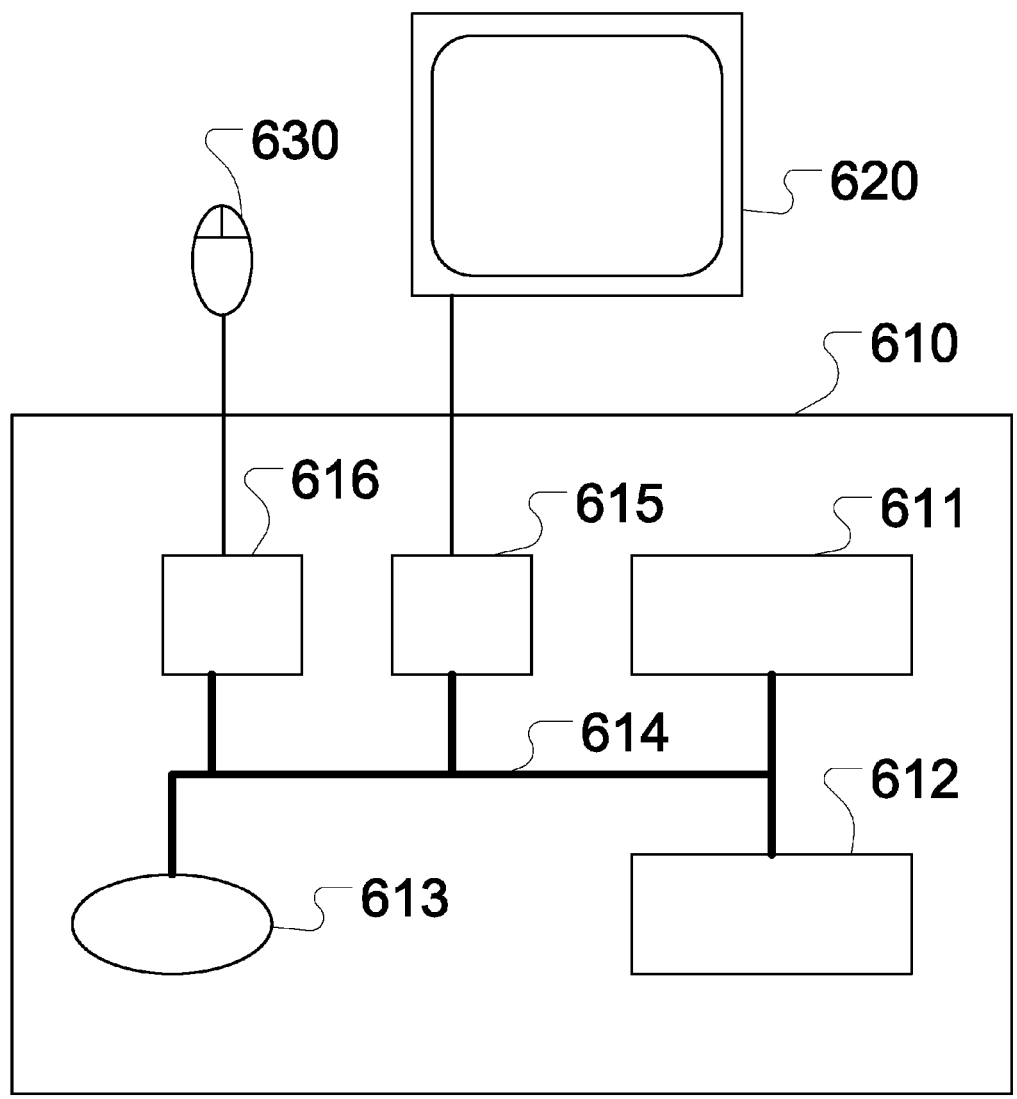
FIG. 6 shows an exemplary computing device useful for performing processes disclosed herein.

These embodiments may be implemented with software, for example modules executed on computing devices such as computing device 610 of FIG. 6. Of course, modules described herein illustrate various functionalities and do not limit the structure of any embodiments. Rather the functionality of various modules may be divided differently and performed by more or fewer modules according to various design considerations.

Computing device 610 has one or more processing device 611 designed to process instructions, for example computer readable instructions (i.e., code) stored on a storage device 613. By processing instructions, processing device 611 may perform the steps and functions disclosed herein. Storage device 613 may be any type of storage device (e.g., an optical storage device, a magnetic storage device, a solid state storage device, etc.), for example a non-transitory storage device. Alternatively, instructions may be stored in remote storage devices, for example storage devices accessed over a network or the internet. Computing device 610 additionally has memory 612, an input controller 616, and an output controller 615. A bus 614 operatively couples components of computing device 610, including processor 611, memory 612, storage device 613, input controller 616, output controller 615, and any other devices (e.g., network controllers, sound controllers, etc.). Output controller 615 may be operatively coupled (e.g., via a wired or wireless connection) to a display device 620 (e.g., a monitor, television, mobile device screen, touch-display, etc.) in such a fashion that output controller 615 can transform the display on display device 620 (e.g., in response to modules executed). Input controller 616 may be operatively coupled (e.g., via a wired or wireless connection) to input device 630 (e.g., mouse, keyboard, touch-pad, scroll-ball, touch-display, etc.) in such a fashion that input can be received from a user.

Of course, FIG. 6 illustrates computing device 610, display device 620, and input device 630 as separate devices for ease of identification only. Computing device 610, display device 620, and input device 630 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 610 may be one or more servers, for example a farm of networked servers, a clustered server environment, or a cloud network of computing devices.

Embodiments have been disclosed herein. However, various modifications can be made without departing from the scope of the embodiments as defined by the appended claims and legal equivalents.

What is claimed is:

1. A computer implemented method executed by one or more computing devices for mining association rules, said method comprising:

sampling, by at least one of the one or more computing devices, a plurality of transactions from a transaction dataset according to a predetermined sampling method;

mining, by at least one of the one or more computing devices, the sampled plurality of transactions based at least in part on a minimum support threshold and a minimum confidence threshold, the mining identifying one or more association rules when the minimum support threshold and the minimum confidence threshold are satisfied;

determining, by at least one of the one or more computing devices, whether the mining identified at least one association rule; and adjusting, by at least one of the one or more computing devices, the minimum support threshold and the minimum confidence threshold based at least in part on a determination that the mining step did not identify at least one association rule, wherein the adjusting increases the probability that further mining will identify at least one association rule by:

decrementing at least one of the minimum support threshold and the minimum confidence threshold by a first percentage based at least in part on a determination that at least one of the minimum support threshold and the minimum confidence threshold is greater than a first value; and decrementing at least one of the minimum support threshold and the minimum confidence threshold by a second percentage based at least in part on a determination that at least one of the minimum support threshold and the minimum confidence threshold is less than or equal to the first value and greater than a second value.

2. The method of claim 1, further comprising receiving, by at least one of the one or more computing devices, initial values of the minimum support threshold and the minimum confidence threshold.

3. The method of claim 2, further comprising:

scanning, by at least one of the one or more computing devices, the transaction dataset to identify 1-itemsets;

computing, by at least one of the one or more computing devices, a statistic measure between the 1-itemsets; and pruning, by at least one of the one or more computing devices, the 1-itemsets from future calculations based at least in part on a determination that the statistic measure is not greater than at least one of the minimum support threshold and the minimum confidence threshold.

4. The method of claim 1, wherein initial values of the minimum support threshold and the minimum confidence threshold are heuristically generated.

5. The method of claim 1, further comprising generating initial values of the minimum support threshold and the minimum confidence threshold, the generating comprising:

scanning, by at least one of the one or more computing devices, the transaction dataset for all 1-itemset transactions;

determining, by at least one of the one or more computing devices, a support count for at least one 1-itemset transaction; and initializing, by at least one of the one or more computing devices, the minimum support threshold and the minimum confidence threshold based on the support count.

6. The method of claim 5, wherein the minimum support threshold and the minimum confidence threshold is half of the sum of a minimum support count for a 1-itemset and a maximum support count for a 1-itemset.

7. The method of claim 1, wherein the first value is five, the second value is zero, the first percentage is five percent, and the second percentage is one percent.

8. The method of claim 1, further comprising preprocessing, by at least one of the one or more computing devices, the transaction dataset containing the plurality of transactions.

9. The method of claim 1, wherein the sampling method is based at least in part on a selection of a sampling method from a user.

10. The method of claim 1, wherein the sampling method comprises a stratified sampling method and wherein sampling comprises:

grouping, by at least one of the one or more computing devices, transactions in the transaction dataset into plural subgroups according to an attribute associated with a customer associated with each transaction; and sampling, by at least one of the one or more computing devices, transactions from the subgroups according to one of a random sampling model and a systematic sampling model.

11. The method of claim 1, wherein the sampling method comprises a systematic sampling method and wherein sampling comprises:

determining, by at least one of the one or more computing devices, an ordered frame size;

grouping, by at least one of the one or more computing devices, transactions into frames according to the ordered frame size; and sampling, by at least one of the one or more computing devices, a transaction from each frame.

12. The method of claim 1, wherein the sampling method comprises a cluster sampling method and wherein sampling comprises:

grouping, by at least one of the one or more computing devices, transactions in the transaction dataset into plural heterogeneous clusters;

selecting, by at least one of the one or more computing devices, one of the plural heterogeneous clusters; and sampling, by at least one of the one or more computing devices, transactions from the selected heterogeneous cluster.

13. The method of claim 1, wherein the sampling method comprises a classified data sampling method and wherein sampling comprises:

receiving, by at least one of the one or more computing devices, attributes of the plurality of transactions in the transaction dataset;

grouping, by at least one of the one or more computing devices, transactions in the transaction dataset into plural sets of classified transactions; and sampling, by at least one of the one or more computing devices, transactions from at least one set of classified transactions in the plural sets of classified transactions.

14. A system for mining association rules, the system comprising:

one or more processors; and one or more memories operatively coupled to at least one of the one or more processors and having instructions stored thereon that, when executed by at least one of the one or more processors, cause at least one of the one or more processors to:

sample a plurality of transactions from a transaction dataset according to a predetermined sampling method;

mine the sampled plurality of transactions based at least in part on a minimum support threshold and a minimum confidence threshold, the mining identifying one or more association rules when the minimum support threshold and the minimum confidence threshold are satisfied;

determine whether the mining identified at least one association rule; and adjust the minimum support threshold and the minimum confidence threshold based at least in part on a determination that the mining step did not identify at least one association rule, wherein the adjusting increases the probability that further mining will identify at least one association rule by:
  decrementing at least one of the minimum support threshold and the minimum confidence threshold by a first percentage based at least in part on a determination that at least one of the minimum support threshold and the minimum confidence threshold is greater than a first value; and
  decrementing at least one of the minimum support threshold and the minimum confidence threshold by a second percentage based at least in part on a determination that at least one of the minimum support threshold and the minimum confidence threshold is less than or equal to the first value and greater than a second value.

15. The system of claim 14, wherein at least one of the one or more memories has further instructions stored thereon that, when executed by at least one of the one or more processors, cause at least one of the one or more processors to:
  scan the transaction dataset to identify 1-itemsets;
  compute a statistic measure between the 1-itemsets; and
  prune the 1-itemsets from future calculations based at least in part on a determination that the statistic measure is not greater than at least one of the minimum support threshold and the minimum confidence threshold.

16. The system of claim 14, wherein initial values of the minimum support threshold and the minimum confidence threshold are heuristically generated.

17. At least one non-transitory computer-readable medium storing computer-readable instructions that, when executed by one or more computing devices, cause at least one of the one or more computing devices to:
  sample a plurality of transactions from a transaction dataset according to a predetermined sampling method;
  mine the sampled plurality of transactions based at least in part on a minimum support threshold and a minimum confidence threshold, the mining identifying one or more association rules when the minimum support threshold and the minimum confidence threshold are satisfied;
  determine whether the mining identified at least one association rule; and
  adjust the minimum support threshold and the minimum confidence threshold based at least in part on a determination that the mining step did not identify at least one association rule, wherein the adjusting increases the probability that further mining will identify at least one association rule by:
    decrementing at least one of the minimum support threshold and the minimum confidence threshold by a first percentage based at least in part on a determination that at least one of the minimum support threshold and the minimum confidence threshold is greater than a first value; and
    decrementing at least one of the minimum support threshold and the minimum confidence threshold by a second percentage based at least in part on a determination that at least one of the minimum support threshold and the minimum confidence threshold is less than or equal to the first value and greater than a second value.

18. The at least one non-transitory computer-readable medium of claim 17, further storing computer-readable instructions that, when executed by at least one of the one or more computing devices, cause at least one of the one or more computing devices to:
  scan the transaction dataset to identify 1-itemsets;
  compute a statistic measure between the 1-itemsets; and
  prune the 1-itemsets from future calculations based at least in part on a determination that the statistic measure is not greater than at least one of the minimum support threshold and the minimum confidence threshold.

19. The at least one non-transitory computer-readable medium of claim 17, wherein initial values of the minimum support threshold and the minimum confidence threshold are heuristically generated.

* * * * *